J. W. SHIPLEY.
SPRING WHEEL.
APPLICATION FILED FEB. 20, 1919.
1,315,343.
Patented Sept. 9, 1919.
5 SHEETS—SHEET 1.
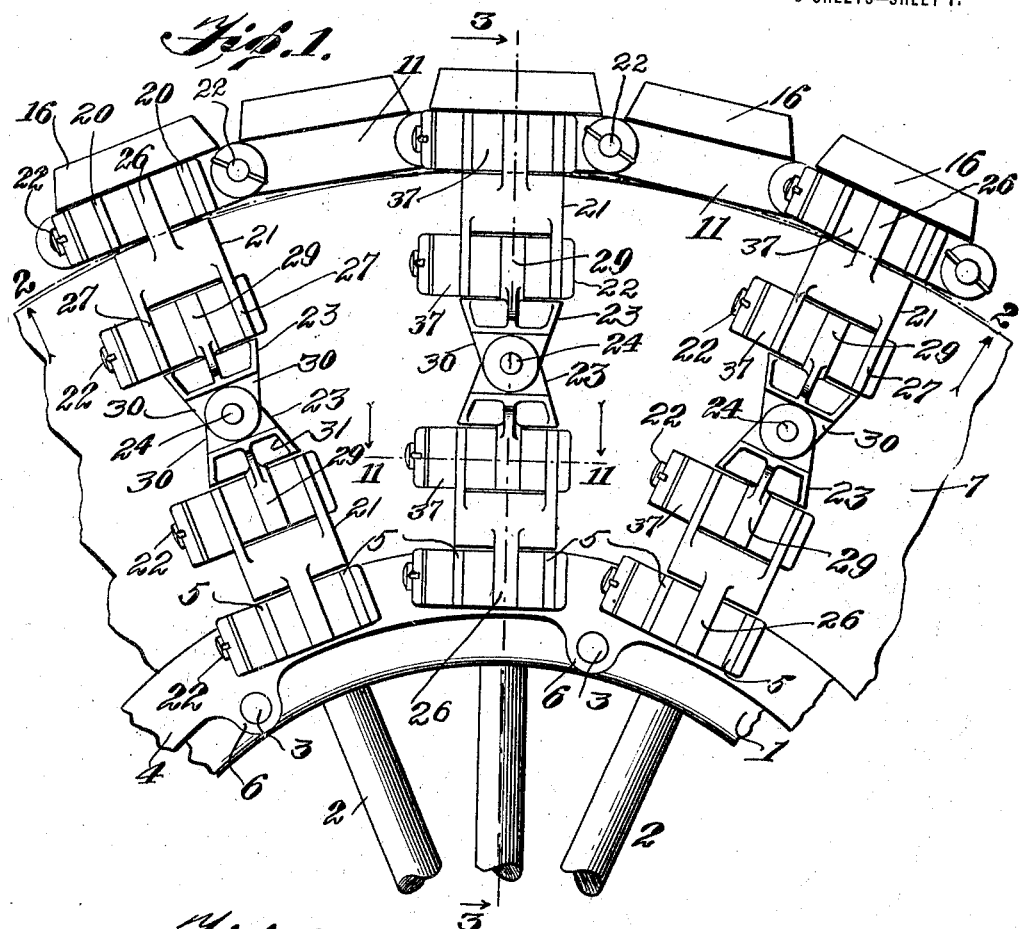
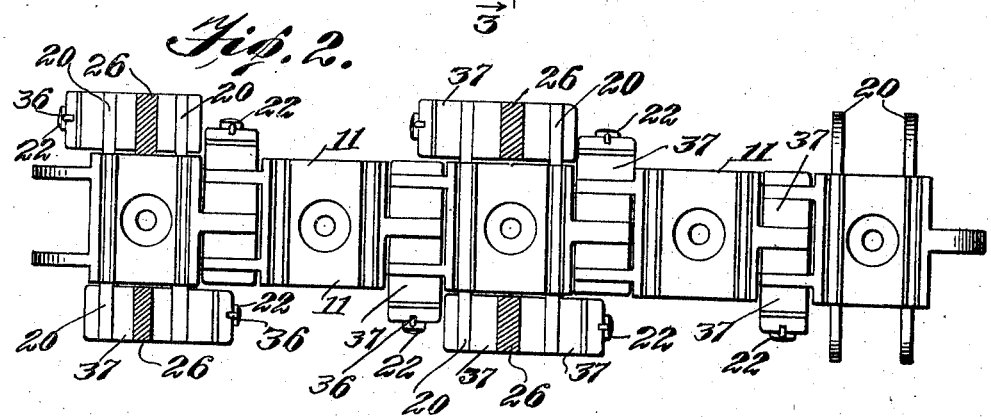
Inventor
J. W. Shipley.

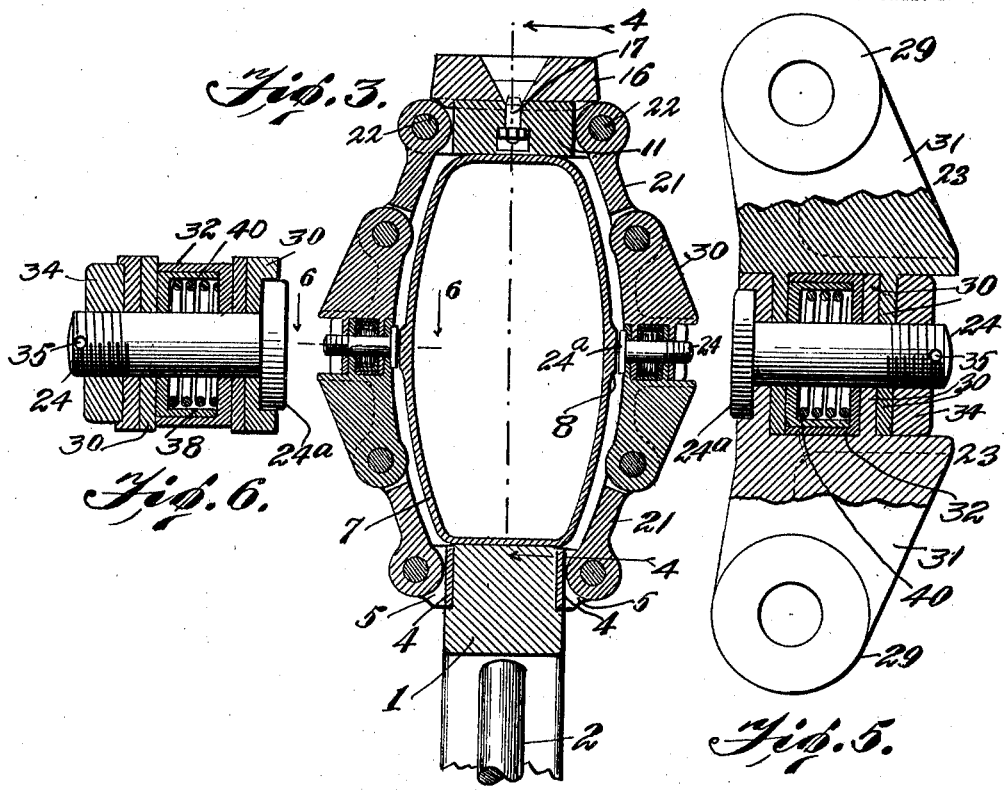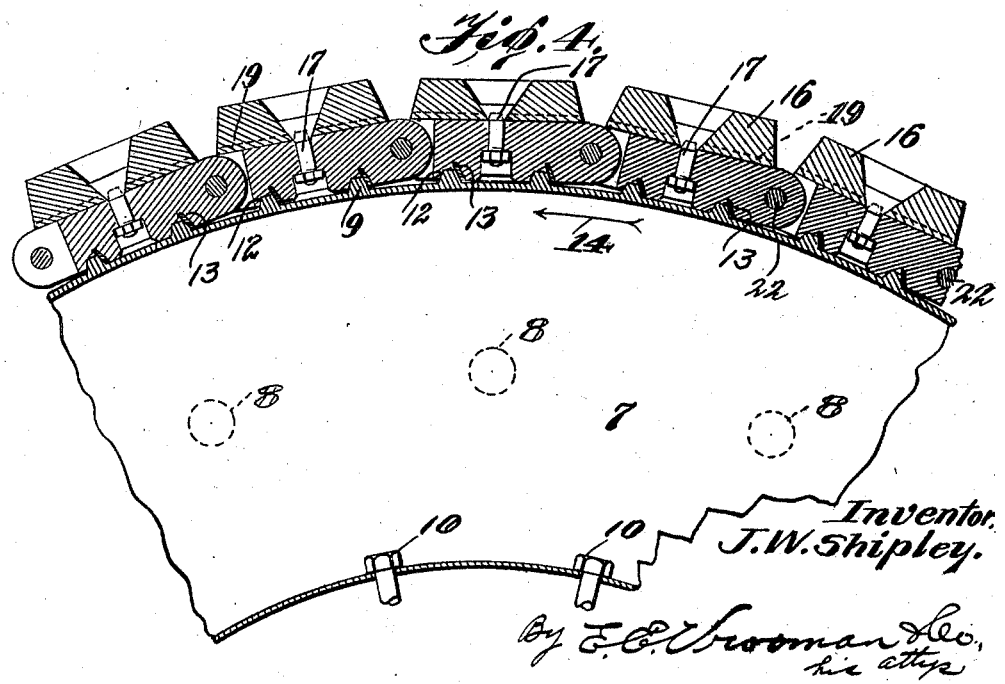

J. W. SHIPLEY.
SPRING WHEEL.
APPLICATION FILED FEB. 20, 1919.
1,315,343.
Patented Sept. 9, 1919.
5 SHEETS—SHEET 3.
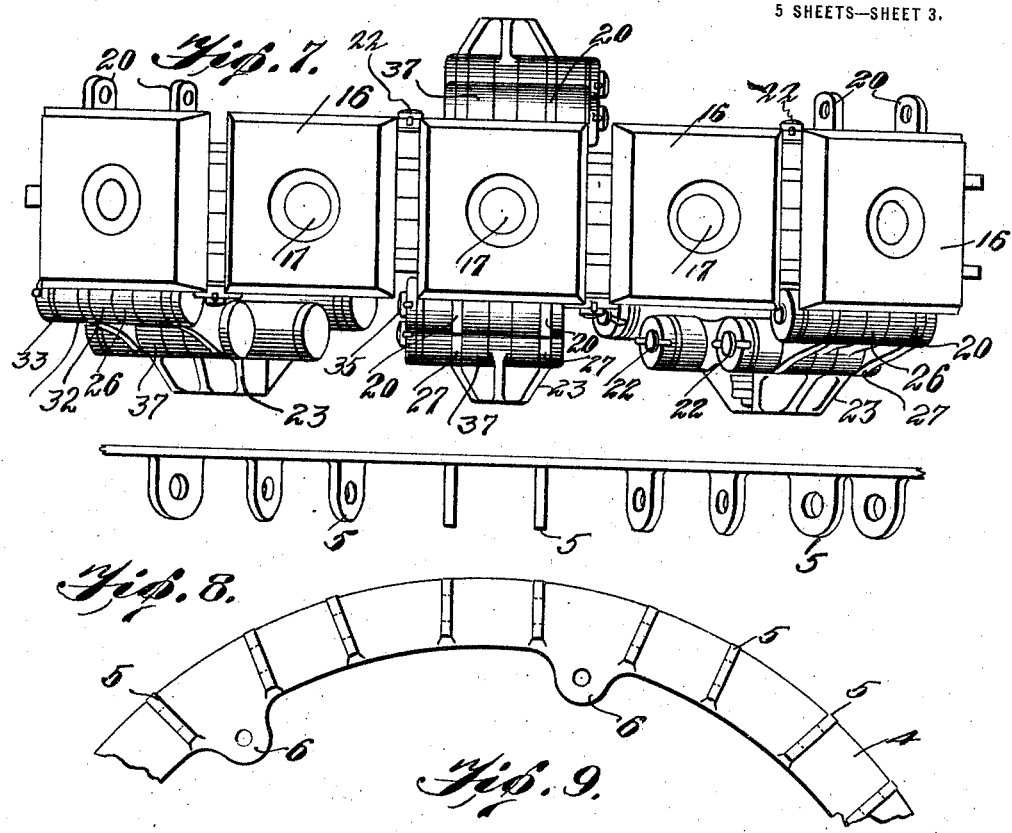
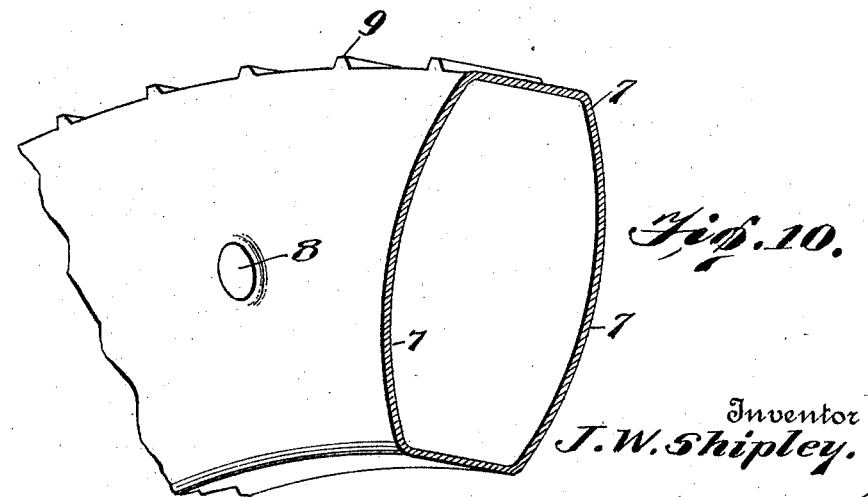
Inventor
J. W. Shipley.
By E. E. Vrooman &Co,
his Attorneys.

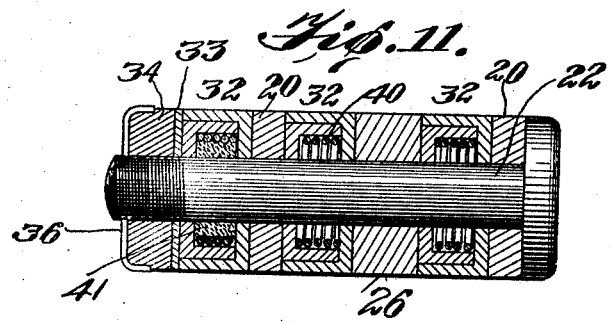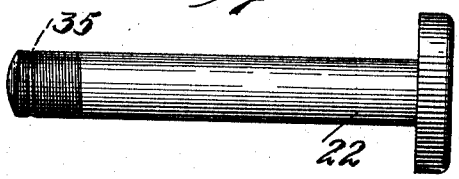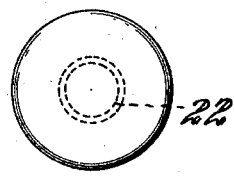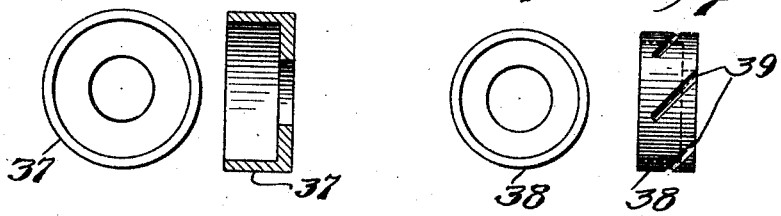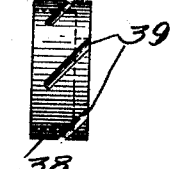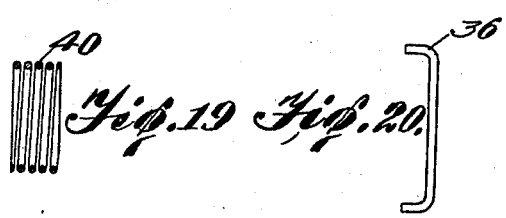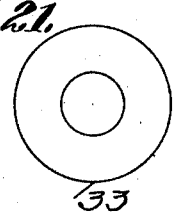

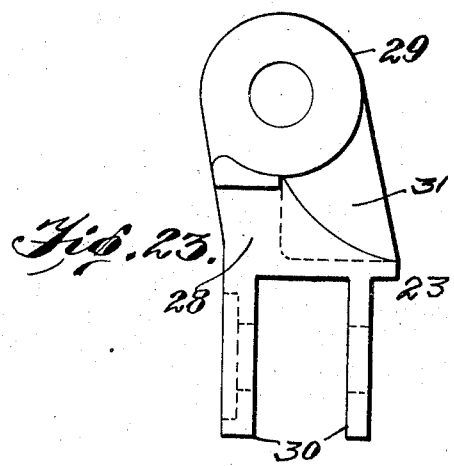
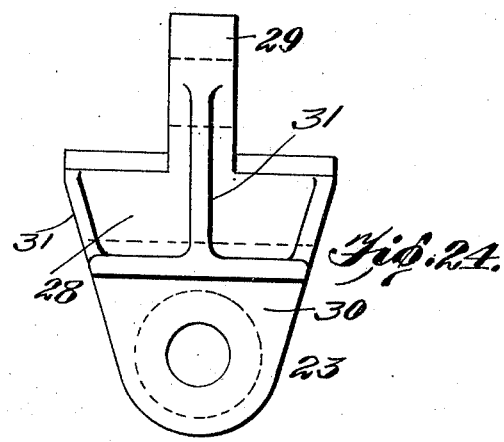
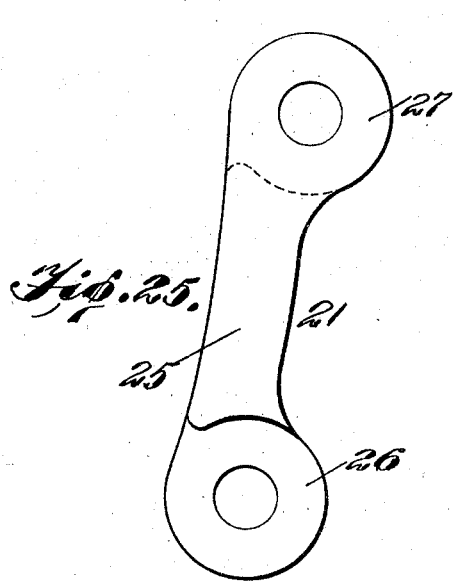
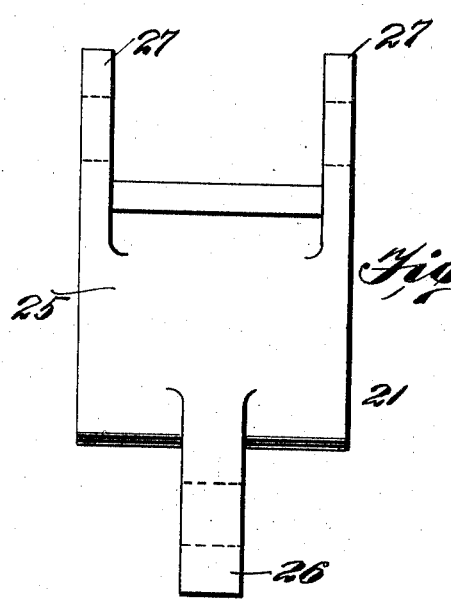
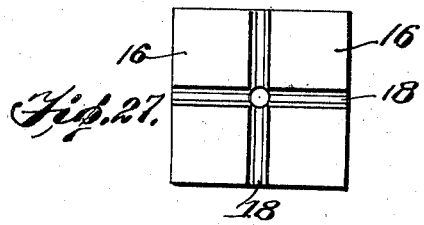

UNITED STATES PATENT OFFICE.

JOSEPH W. SHIPLEY, OF WASHINGTON, DISTRICT OF COLUMBIA.

SPRING-WHEEL.

1,315,343.   Specification of Letters Patent.   Patented Sept. 9, 1919.

Application filed February 20, 1919. Serial No. 278,123.

*To all whom it may concern:*

Be it known that I, JOSEPH W. SHIPLEY, a citizen of the United States, residing at Washington, in the District of Columbia, have invented certain new and useful Improvements in Spring-Wheels, of which the following is a specification, reference being had therein to the accompanying drawings.

This invention relates to spring wheels, and has for its object the construction of a wheel that has a tread or tire structure made in a highly efficient manner, and which is extremely durable as well as being impossible to destroy or effect its great utility by being punctured.

Another object of the invention is the construction of the tread of a wheel which will give a resilient or springy action, having all of the advantages of a pneumatic tire, yet being impossible to puncture.

With these and other objects in view, my invention comprises certain novel constructions, combinations, and arrangements of parts as will be hereinafter specifically described, illustrated in the accompanying drawings, and more particularly pointed out in the appended claims.

In the drawings,

Figure 1 is a fragmentary view in side elevation of a part of a wheel including my specific tire, constructed in accordance with the present invention.

Fig. 2 is an inverted view of a part of the tread taken on line 2—2, Fig. 1, looking in the direction of the arrows.

Fig. 3 is a sectional view taken on line 3—3, Fig. 1, looking in the direction of the arrows.

Fig. 4 is a longitudinal sectional view taken on line 4—4, Fig. 3.

Fig. 5 is an enlarged sectional view of the central joint of each link structure.

Fig. 6 is a sectional view taken on line 6—6, Fig. 3.

Fig. 7 is a fragmentary top plan view of my improved tire or wheel structure, showing part of the link structure removed.

Fig. 8 is a fragmentary plan view of one of the rings attached to the side of the felly, while Fig. 9 is a view in side elevation of the portion of the ring shown in Fig. 8.

Fig. 10 is a fragmentary sectional view of the body casing of my tire.

Fig. 11 is a sectional view taken on line 11—11, Fig. 1, looking in the direction of the arrows.

Fig. 12 is a view in side elevation of the bolt forming part of the primary joints.

Fig. 13 is a view in elevation of the head of the bolt shown in Fig. 12.

Fig. 14 is an end view of the primary section of the spring-containing casing, while Fig. 15 is a central section of the same.

Fig. 16 is an end view of the auxiliary section of the spring-containing section, while Fig. 17 is a side view of the same.

Fig. 18 is an end view of the coil spring, while

Fig. 19 is a central section of the same.

Fig. 20 is a view in side elevation of the nut lock wire.

Fig. 21 is a view in elevation of the washer, while

Fig. 22 is a vertical section of the same.

Fig. 23 is a side view of the links constituting the central joint of each link structure of my improved tire.

Fig. 24 is a front view of the link shown in Fig. 23.

Fig. 25 is a side view of the outer links of each link structure, while

Fig. 26 is a front view of the same.

Fig. 27 is a bottom view of each shoe plate.

Referring to the drawings by numerals, 1 designates the felly of the wheel 2, and secured at opposite sides of the felly, by fastening means, such as rivets 3, are annular plates or rings 4. Formed upon these annular plates or rings 4 are outwardly-extending apertured lugs 5. Inwardly extending apertured ears 6 are provided for attaching the rings 4 to the felly, and through these apertured ears 6 extend said fastening means 3.

Positioned upon the periphery of the felly 1, is a resilient, tubular-like body casing 7. Upon the sides of the casing are formed bearing knobs 8 for the purpose hereinafter described. Integral with the upper, flat, outer face of the body casing 7 are transverse ribs 9. The casing 7 is fastened (Fig. 4) by bolts 10 securely to the felly 1.

Placed around the outer face or periphery of the tubular-like casing 7 is a chain constituted by the tread links 11. Each tread link or tread plate 11 is preferably provided with a pair of transverse grooves or sockets 12 (Fig. 4) on its inner face, and in each groove, on one side, is placed a piece of fiber, or the like, 13 so as to take up the noise of contact of the ribs 9 on the tread links, the fiber piece 13 being on the opposite side to the direction of travel, as indicated by the arrow 14 in Fig. 4. Each tread link or plate 11 is pivotally connected to its co-operating plates by a joint structure including a bolt 22, hereinafter specifically described, which joint structure is the same in principle as that used to connect the side links.

A shoe plate 16 rests upon each tread link, and by means of a rivet structure 17 extending through link 11 and shoe 16, these members are secured together. Referring to Fig. 27, it will be seen that intersecting grooves 18 are formed upon the inner face of each shoe plate, and into these grooves 18 project ribs 19, shown by dotted lines in Fig. 4, which ribs are formed upon the outer face of the links 11, whereby the shoe plates 16 are kept from rotating upon the links 11.

In the construction of my improved tire for resilient or spring wheels, I employ a plurality of link structures on each side, and as each link structure is of similar construction, it will only be necessary to specifically describe one. Each link structure is fastened to alternating tread links, and to accomplish this result each alternating tread link is provided at opposite sides with outwardly-extending apertured lugs 20. The inner end of each link structure is connected to the lugs 5 of the rings 4. Outer or primary links 21 are pivotally connected to the lugs on the tread links and the lugs on the ring 4 by means of similarly constructed joints including bolts 22; these joints, including bolts 22, will be hereinafter specifically described. Inner or auxiliary links 23 are connected together by means of bolt 24 (Fig. 1) and these inner or auxiliary links 23 are pivotally connected to the primary links 21 by joint structures including the bolts 22. It is to be understood that the same joint structure is employed for connecting the outer ends of the link structure to the tread links and to the felly rings, and in general principle, the same type of a joint structure is employed for connecting the central or auxiliary links 23, in which last-mentioned joint structure bolt 24 is included, although the bolt 24 and this joint structure are at right angles to the other joint structures of each link construction, and the central joint structure is of a less number of parts than the outer joint structure including the bolts 22.

The primary link 21 is shown in detail in Figs. 25 and 26. This link comprises a central body 25, and extending from one end is a primary apertured lug 26, and extending from the other end is a pair of parallel auxiliary lugs 27.

The central or auxiliary links 23 are specifically shown in Figs. 23 and 24. Each auxiliary link comprises a body 28, and extending centrally from the body 28 is an apertured lug 29, and extending from the opposite end of the body 28 is a pair of parallel apertured lugs 30; these lugs 30 are positioned at right angles to the lug 29, and the body 28 is strengthened by a T-shaped web 31 which acts as a brace for the angularly-disposed lugs 29 and 30.

The primary joints, each including a bolt 22, are preferably four in number in each link structure; two of these joints being contiguous to the felly and two contiguous to the chain constituted by the tread links (Fig. 1). In each joint structure (Fig. 11), the lug 26 has at each side thereof, on bolt 22, the sectional spring-containing casings 32, and upon the outside of one of the lugs 20 is another spring-containing casing 32, which last-mentioned casing is near the threaded end of the bolt; a washer 33 is placed against the outer casing 32, and a nut 34 is threaded against washer 33, and running through the bolt at 35 (Fig. 12) is a wire nut lock 36 which is bent down at its ends (Fig. 11), locking the nut in its adjusted position. Each spring-containing casing comprises an outer or primary cup-like shell 37 (Figs. 14 and 15) and an inner or auxiliary cup-like shell 38 (Figs. 16 and 17), in the outer face of which shell 38 are spirally-arranged grooves 39 for receiving a lubricant; the primary and auxiliary shells fit together as shown in Fig. 11, and within the inner or auxiliary shell is placed a coil spring 40, and a suitable filling, such as graphite 41, is placed in each casing 32.

The fastening means for connecting the engaging lugs 30 of the central or auxiliary links 23 includes said bolt 24 (Fig. 5). A sectional casing 32 is mounted upon the connecting bolt 24, and said casing is positioned between the lugs 30 of each link 23. It is not necessary to describe the casing 32 in this application, for it is the same in construction as the sectional casing shown in Fig. 11. Bolt 24 is provided with a nut 34, the same as bolt 22, and in the aperture 35 is placed the wire nut lock 36. The heads 24ª of bolts 24 bear against the bearing knobs 8, hereinbefore mentioned, whereby the knobs produce a substantial bearing for the bolts, preventing injury to the body casing by the bolts striking or rubbing thereon (Fig. 3).

From the foregoing description, it will be understood that in carrying out my invention, I have provided on a felly of a wheel a tire structure including the body casing; the chain of tread links upon the body casing; the shoe plates upon the tread links; the link structures at the sides connecting up the chain of tread links and the felly structure of the wheel, holding the hollow body casing in position, yet permitting the lateral expansion of the body casing by reason of weight being placed thereon, each link structure including the outer or primary links that are permitted to swing or pivot laterally or outwardly, while the auxiliary or central links are pivotally connected together at right angles to the outer links, whereby there will be permitted a hinging action to each link construction parallel with the longitudinal axis of the tire or body casing. Details of constructions are, of course, involved in the general construction of my improved wheel or tire structure thereof, and, consequently, I reserve the right to make such alterations and modifications in carrying out my invention as shall appear to one skilled in the art to which this invention relates, which modifications or alterations shall fairly fall within the scope of the appended claims.

What I claim is:

1. In an apparatus of the class described, the combination with a felly, of a tubular body casing surrounding and mounted upon said felly, a chain constituted by tread links upon said body casing, shoe plates upon said tread links, a plurality of link structures connecting the chain and felly, each link structure including primary links adapted to swing laterally, auxiliary central links adapted to swing parallel with the longitudinal axis of the body casing, means pivotally connecting said auxiliary links, means pivotally connecting one of the primary links to the chain and means pivotally connecting the other primary link to the felly.

2. In a wheel of the class described, the combination of a felly, a body casing on said felly, a tread structure on the body casing, a plurality of link structures connecting said tread structure to said felly, each link structure including outwardly swinging links, and links adapted to swing parallel with the longitudinal axis of the body casing.

3. In a wheel of the class described, the combination with a felly, of rings provided with outwardly extending lugs secured to said felly, a body casing upon said felly, a tread structure upon said casing, and means connecting said tread structure to said outwardly extending lugs of the rings.

4. In a wheel of the class described, the combination with a felly, of a casing upon said felly, said casing provided with ribs, tread links provided with grooves, sound-deadening means in each groove, said ribs of the casing extending into said grooves and bearing against said sound-deadening means, and means connecting said tread links to said felly.

5. In a wheel of the class described, the combination with a felly, of a body casing on said felly, said body casing provided with transverse ribs, tread links provided with transverse grooves in their inner faces, transversely positioned sound-deadening strips mounted upon said tread links and in said grooves, said ribs of the casing resting in said grooves and bearing against said sound-deadening strips, and means fastening said tread links to said felly.

6. In a wheel of the class described, the combination with a felly, of a chain of tread links positioned around said felly, means supporting and fastening said chain of tread links to said felly, each tread link provided with intersecting ribs upon its outer face, and a shoe plate on each tread link and provided with grooves on its inner face registering with the ribs of the link.

7. In a wheel of the class described, the combination with a felly, of a chain of tread links surrounding said felly, means positioned between the tread links and the felly and supporting the same in spaced position upon the felly, link structures connecting said chain of tread links to said felly, each link structure comprising links, joint structures connecting said links together, and each joint structure including a bolt and a sectional spring-containing casing mounted upon the bolt.

8. In a wheel of the class described, the combination with a felly, of a tread structure surrounding said felly, means supporting said tread structure in spaced position upon said felly, link structures at the sides of said tread structure and the felly, each link structure comprising primary links pivotally connected to the felly and tread structure, and auxiliary links pivotally connected together at their inner ends and pivotally connected at their outer ends to the primary links, the primary links adapted to swing or pivot in a plane at substantially right angles to the pivotal movement of the auxiliary links.

9. In a wheel of the class described, the combination with a felly, of a tread structure surrounding said felly, means placing said tread structure away from said felly, of link structures connecting said tread structure to said felly, each link structure including primary and auxiliary links, each primary link comprising a body provided at one end with an apertured lug and at its opposite end with parallel apertured lugs, and means extending through the apertured lugs of the links for pivotally connecting the links together.

10. In a wheel of the class described, the combination with a felly, of a tread structure surrounding said felly, link structures pivotally connecting said tread structure to said felly, each link structure including a plurality of links, bolts pivotally connecting said links together, and a sectional spring-containing casing upon each bolt between the links.

11. In a wheel of the class described, the combination with a felly, of a tread structure surrounding said felly, said tread structure provided with outwardly extending lugs, link structures connected to said lugs, means connecting said link structures also to said felly, each link structure comprising outer or primary links pivotally mounted to swing laterally or outwardly, and central or auxiliary links pivotally connected to swing only at right angles to the line of movement of the outer or primary links.

12. In a wheel of the class described, the combination with a felly, of a tread structure surrounding said felly, link structures pivotally connecting said tread structure to said felly, each link structure comprising primary links and auxiliary links, each primary link comprising a body and inner parallel lugs and an outer central lug, the auxiliary links each comprising inner parallel lugs and an outer central lug, the central lug of the auxiliary links positioned between the inner parallel lugs of the primary links, means connecting the inner lugs of the primary links to the outer lugs of the auxiliary links, and means pivotally connecting the inner parallel lugs of the auxiliary links.

13. In a joint structure of the class described, the combination with links, of a bolt extending through portions of said links, a sectional spring-containing casing upon said bolt and positioned between portions of said links, said casing comprising cup-like portions, one positioned over the other, one of said sections provided with grooves on its outer surface for receiving a lubricant, and a coil spring in said casing for expanding the sections to take up wear on the links.

14. In a joint structure of the class described, the combination with links, fastening means extending through said links and connecting the same together, and a sectional casing on said fastening means provided with means for expanding the sections to take up wear on the links.

15. In a wheel of the class described, the combination with a felly, of a tread structure surrounding said felly, means spacing said tread structure from said felly, link structures connecting said tread structure to said felly, each link structure comprising links pivotally connected together, and some of said links being provided with T-shaped reinforcing webs.

16. In a wheel of the class described, the combination with a felly, of a tread structure surrounding said felly, link structures connecting said tread structure to said felly including auxiliary links, each comprising a body provided at one end with an apertured lug and the body provided at its other end with parallel apertured lugs at right angles to the first-mentioned lug, and a substantially T-shaped web reinforcing the body and connecting said lugs at the ends of the body together.

17. In a wheel of the class described, the combination with a felly, of a tread structure surrounding said felly, means spacing said tread structure away from said felly, link structures connecting said tread structure to said felly, each link structure including links, each link provided with a lug parallel with a lug upon the next contiguous link, an expansible casing between the contiguous parallel lugs, and fastening means extending through the lugs and the casing.

18. In a wheel of the class described, the combination with a felly, of a tread structure surrounding said felly, link structures connecting said tread structure to said felly, each link structure comprising primary links provided with parallel lugs, auxiliary links provided with outwardly extending lugs, the outwardly extending lugs of the auxiliary links positioned between the parallel lugs of the primary links, sectional casings between the outwardly extending lugs of the auxiliary links and the parallel lugs of the primary links, means connecting said outwardly extending lugs of the auxiliary links and said parallel lugs of the primary links together, the auxiliary links also provided with parallel, inwardly extending lugs, a sectional casing between said inwardly extending lugs of the auxiliary links, and means connecting said lugs of the auxiliary links together.

19. In a wheel of the class described, the combination with a felly, of a tread structure surrounding said felly, link structures connecting said tread structure to said felly, each link structure comprising links pivotally connected, and some of the links being adapted to swing only at right angles to the line of swing or movement of the other links.

20. In a wheel of the class described, the combination with a felly, of a body casing upon said felly, said body casing provided upon its sides with bearing knobs, of a tread structure mounted upon said casing, link structures connecting said tread structure to said felly, each link structure including a joint structure, and each joint structure including a bolt adapted to bear against a bearing knob.

21. In a wheel of the class described, the combination with a felly, of a tread structure surrounding said felly, a hollow body casing interposed between the felly and the tread structure, said casing provided with bearing knobs upon its sides, each bearing knob having a flat outer face, link structures connecting the tread structure to said felly, each link structure provided with a bolt extending at right angles to the longitudinal axis of the casing, and said bolt provided with a flat head adapted to bear upon the flat outer face of a bearing knob.

In testimony whereof I hereunto affix my signature.

JOSEPH W. SHIPLEY.

Copies of this patent may be obtained for five cents each, by addressing the "Commissioner of Patents, Washington, D. C."